(12) United States Patent
Xiong et al.

(10) Patent No.: US 8,176,327 B2
(45) Date of Patent: May 8, 2012

(54) AUTHENTICATION PROTOCOL

(75) Inventors: Jay Xiong, Acton, MA (US); Shi Baw Ch'ng, North Billerica, MA (US)

(73) Assignee: Airvana, Corp., Chelmsford, MA (US)

( * ) Notice: Subject to any disclaimer, the term of this patent is extended or adjusted under 35 U.S.C. 154(b) by 1029 days.

(21) Appl. No.: 11/645,986

(22) Filed: Dec. 27, 2006

(65) Prior Publication Data

US 2008/0162926 A1    Jul. 3, 2008

(51) Int. Cl.
*H04L 9/32* (2006.01)
*G06F 7/04* (2006.01)

(52) U.S. Cl. .......................................... 713/176; 726/11
(58) Field of Classification Search .................. 713/176; 726/11
See application file for complete search history.

(56) References Cited

U.S. PATENT DOCUMENTS

| | | | |
|---|---|---|---|
| 6,445,922 B1 * | 9/2002 | Hiller et al. .................... | 455/433 |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,996,714 B1 | 2/2006 | Halasz et al. .................. | 713/163 |
| 7,003,719 B1 | 2/2006 | Rosenoff et al. ........... | 715/500.1 |
| 7,082,535 B1 | 7/2006 | Norman et al. ............... | 713/163 |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,515,643 B2 | 4/2009 | Chung | |
| 7,558,356 B2 | 7/2009 | Pollman et al. | |
| 7,558,588 B2 | 7/2009 | To et al. | |
| 7,603,127 B2 | 10/2009 | Chung et al. | |
| 7,626,926 B2 | 12/2009 | Abi-Nassif et al. | |
| 7,672,682 B2 | 3/2010 | Sharma et al. | |
| 7,729,243 B2 | 6/2010 | Ananthaiyer et al. | |
| 7,730,189 B2 | 6/2010 | Harikumar et al. | |
| 2002/0196749 A1 | 12/2002 | Eyuboglu et al. | |
| 2004/0114553 A1 * | 6/2004 | Jiang et al. .................... | 370/328 |
| 2005/0081036 A1 * | 4/2005 | Hsu ............................... | 713/171 |

(Continued)

FOREIGN PATENT DOCUMENTS

GB    2452688    3/2009

OTHER PUBLICATIONS

Microsoft Corporation, "The Advantages of Protected Extensible Authentication Protocol (PEAP): A Standard Approach to User Authentication for IEEE 802.11 Wireless Network Access," Jul. 2003.

(Continued)

*Primary Examiner* — Techane Gergiso
(74) *Attorney, Agent, or Firm* — Fish & Richardson P.C.

(57) ABSTRACT

A method includes sending a first authentication challenge from an authenticator to an access terminal, and receiving, at the authenticator, a first return message from the access terminal that includes an identifier of the access terminal and a response to the first challenge. A second authentication challenge is sent from the authenticator to the access terminal, in which the second authentication challenge is determined by an authentication server based in part on the identifier of the access terminal previously received along with the response to the first challenge. The authenticator receives a second return message from the access terminal that includes a response to the second authentication challenge.

29 Claims, 5 Drawing Sheets

U.S. PATENT DOCUMENTS

| | | | |
|---|---|---|---|
| 2005/0102529 A1* | 5/2005 | Buddhikot et al. | 713/200 |
| 2005/0177521 A1* | 8/2005 | Crosson Smith | 705/67 |
| 2005/0213555 A1* | 9/2005 | Eyuboglu et al. | 370/349 |
| 2005/0243749 A1 | 11/2005 | Mehrabanzad et al. | |
| 2005/0245279 A1 | 11/2005 | Mehrabanzad et al. | |
| 2005/0251681 A1* | 11/2005 | Robles et al. | 713/172 |
| 2006/0009197 A1* | 1/2006 | Chiba et al. | 455/411 |
| 2006/0154645 A1* | 7/2006 | Valkenburg | 455/411 |
| 2006/0240782 A1 | 10/2006 | Pollman et al. | |
| 2006/0259759 A1* | 11/2006 | Maino et al. | 713/151 |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Palnati et al. | |
| 2007/0077948 A1 | 4/2007 | Sharma et al. | |
| 2007/0097916 A1 | 5/2007 | Eyuboglu et al. | |
| 2007/0140159 A1* | 6/2007 | Eronen et al. | 370/328 |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0220573 A1 | 9/2007 | Chiussi et al. | |
| 2007/0221725 A1* | 9/2007 | Kawaguchi | 235/382 |
| 2007/0230419 A1 | 10/2007 | Raman et al. | |
| 2007/0238442 A1 | 10/2007 | Mate et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |
| 2009/0082020 A1 | 3/2009 | Ch'ng et al. | |
| 2009/0088155 A1 | 4/2009 | Kim | |
| 2009/0116445 A1 | 5/2009 | Samar et al. | |
| 2009/0154447 A1 | 6/2009 | Humblet | |
| 2009/0156165 A1 | 6/2009 | Raghothaman et al. | |
| 2009/0156195 A1 | 6/2009 | Humblet | |
| 2009/0156218 A1 | 6/2009 | Garg et al. | |
| 2009/0163202 A1 | 6/2009 | Humblet et al. | |
| 2009/0163216 A1 | 6/2009 | Hoang et al. | |
| 2009/0163238 A1 | 6/2009 | Rao et al. | |
| 2009/0164547 A1 | 6/2009 | Ch'ng et al. | |
| 2009/0168766 A1 | 7/2009 | Eyuboglu et al. | |
| 2009/0168788 A1 | 7/2009 | Den et al. | |
| 2009/0170440 A1 | 7/2009 | Eyuboglu et al. | |
| 2009/0170475 A1 | 7/2009 | Ch'Ng et al. | |
| 2009/0170520 A1 | 7/2009 | Jones | |
| 2009/0170547 A1 | 7/2009 | Raghothaman et al. | |
| 2009/0172169 A1 | 7/2009 | Ramaswamy et al. | |
| 2009/0172397 A1 | 7/2009 | Kim | |
| 2009/0186626 A1 | 7/2009 | Raghothaman et al. | |
| 2009/0262697 A1 | 10/2009 | To et al. | |
| 2009/0318162 A1 | 12/2009 | Chung et al. | |
| 2010/0054219 A1 | 3/2010 | Humblet et al. | |
| 2010/0075658 A1 | 3/2010 | Hou et al. | |
| 2010/0085910 A1 | 4/2010 | Humblet | |

OTHER PUBLICATIONS

3rd Generation Partnership Project 2 "3GPP2", "cdma2000 High Rate Packet Data Interface Specification", C.S0024, version 4, Oct. 25, 2002 (548 pages).

3rd Generation Partnership Project 2 "3GPP2", "cdma2000 High Rate Packet Data Interface Specification", C.S0024-A, version 1, Mar. 2004 (1083 pages).

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

* cited by examiner

AUTHENTICATION PROTOCOL

BACKGROUND

The description relates to authentication protocols.

When a service provider provides services (e.g., phone, e-mail, and Internet services) to an access terminal (e.g., mobile phone or computer), it is useful to authenticate the access terminal to, e.g., control access to the services and ensure that the correct entity is billed for the services provided. Several protocols have been developed for authentication. For example, Challenge Handshake Authentication Protocol (CHAP) has been used by many cellular phones and other mobile devices as the authentication protocol for gaining access to Internet Protocol (IP) networks through either communication links that comply with Point-to-Point Protocol (PPP) or Mobile IP. More recently, Third Generation Partnership Project 2 (3GPP2) has chosen Internet Key Exchange v2/IP security (IKEv2/IPSec) as the access method to provide authentication and secure tunnel over wireless links for IP based wireless networks.

In some examples, account information (e.g., name and address of owners of access terminals, identification codes of the access terminals) and security information (e.g., passwords) are stored at a central server, referred to as the authentication, authorization, and accounting (AAA) sever (also called the authentication server). A security gateway that serves as a gate keeper to the networks of the service provider can be configured to communicate with various kinds of access terminals using various kinds of communications protocols. The security gateway communicates with the AAA server to determine whether to grant access to a particular access terminal. If access is granted, the security gateway connects the access terminal to an application server that provides services to the access terminal. The security gateway may establish a secure link with the access terminal to prevent eavesdropping and avoid third party attacks to the networks of the service provider.

The access terminals can be, e.g., wireless communication devices that comply with, e.g., 1×EV-DO protocol, which has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, herein incorporated by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated by reference. Other wireless communication protocols may also be used.

SUMMARY

In one aspect, in general, a method includes sending a dummy authentication challenge from an authenticator to an access terminal, and receiving, at the authenticator, a first return message from the access terminal that includes an identifier of the access terminal and a response to the dummy challenge. A second authentication challenge is sent from the authenticator to the access terminal, the second authentication challenge being determined based in part on the identifier of the access terminal previously received along with the response to the dummy challenge. At the authenticator, a second return message is received from the access terminal that includes a response to the second authentication challenge.

Implementations of the method may include one or more of the following features. The second authentication challenge is determined by an authentication server based in part on the identifier of the access terminal. Sending the second authentication challenge includes sending a first packet having the second authentication challenge, the first packet complying with a first authentication protocol in which the identifier of the access terminal is not required for determining authentication challenges sent to the access terminal. The method includes receiving, at the authenticator, a second packet from an authentication server. The second packet has the second authentication challenge and complies with a second authentication protocol in which the identifier of the access terminal is used to determine authentication challenges sent to the access terminal. The method includes extracting the second authentication challenge from the second packet and inserting the second authentication challenge into the first packet. In some examples, the first authentication protocol includes Challenge Handshake Authentication Protocol (CHAP) and the second authentication protocol includes IKEv2 Extensible Authentication Protocol-Message Digest 5 (EAP-MD5). The response to the dummy challenge is not used by the authenticator in authenticating the access terminal. In some examples, the access terminal complies with CHAP. The access terminal complies with at least one of Point-to-Point Protocol (PPP) CHAP and Mobile IP CHAP. The method includes sending the response to the second authentication challenge to the authentication server, and receiving a message from the authentication server indicating that the access terminal has been authenticated.

In another aspect, in general, a method of authenticating an access terminal includes sending a first challenge in a first CHAP packet to the access terminal to obtain an identifier of the access terminal, and sending a second challenge in a second CHAP packet, the authentication challenge being determined by an authentication server based on the identifier of the access terminal.

Implementations of the method may include one or more of the following features. The method includes sending the identifier to an authentication server in a first EAP packet and receiving the second challenge from the authentication server in a second EAP packet. The method includes extracting the second challenge from the second EAP packet and inserting the second challenge into the second CHAP packet. The first challenge includes a dummy challenge, and the response to the first challenge is not used by the authenticator in authenticating the access terminal.

In another aspect, in general, a method includes sending a first CHAP packet to an access terminal to obtain a network address identifier (NAI) of the access terminal, the first CHAP packet including a first challenge. The method includes sending a first EAP packet that includes the NAI to an authentication server, and receiving a second EAP packet that includes an authentication challenge that is determined based on the NAI. The method includes sending a second CHAP packet including the authentication challenge to the access terminal, and receiving from the access terminal a third CHAP packet including a response to the authentication challenge.

Implementations of the method may include one or more of the following features. The method includes extracting the authentication challenge from the second EAP packet and inserting the authentication challenge into the second CHAP packet. The authentication server determines the authentication challenge using the MD5 algorithm. The method includes sending a third EAP packet that includes the response to the authentication challenge to the authentication server, receiving a fourth EAP packet from the authentication server indicating that the access terminal has been authenticated, and sending a fourth CHAP packet to the access terminal indicating that the authentication has been successful. The first challenge includes a dummy challenge, and the response to the first challenge is not used by the authenticator in authenticating the access terminal.

In another aspect, in general, a method for establishing a secure connection between an access terminal that complies with a first authentication protocol and an authentication server that complies with a second authentication protocol. The method includes sending a first challenge to the access terminal to obtain an identifier of the access terminal, sending the identifier to the authentication server, and receiving a second challenge from the authentication server, the second challenge being determined based on the identifier. The method includes sending the second challenge to the access terminal, receiving a response to the second challenge from the access terminal, and sending the response to the second challenge to the authentication server. The first authentication protocol does not use an identifier of the access terminal when determining authentication challenges sent to the access terminal, and the second authentication protocol uses the identifier of the access terminal when determining authentication challenges sent to the access terminal.

Implementations of the method may include one or more of the following features. The first authentication protocol includes CHAP and the second authentication protocol includes EAP-MD5. The method includes extracting the second challenge from a first packet sent from the authentication server and inserting the second challenge into a second packet sent to the access terminal, the first packet and the second packet having different packet formats. The first challenge includes a dummy challenge, and the response to the first challenge is not used by the authenticator in authenticating the access terminal.

In another aspect, in general, an apparatus includes an authenticator configured to send a first authentication challenge to an access terminal, receive an identifier of the access terminal and a response to the first challenge from the access terminal, and send a second authentication challenge to the access terminal. The second authentication challenge is determined by an authentication sever based in part on the identifier of the access terminal previously received along with the response to the first challenge. The authenticator is configured to receive a response to the second authentication challenge.

Implementations of the method may include one or more of the following features. The authenticator sends the second authentication challenge in a first packet that complies with a first authentication protocol in which the identifier of the access terminal is not used for determining authentication challenges sent to the access terminal. The authenticator is configured to receive a second packet that includes the second authentication challenge from an authentication server, the second packet complying with a second authentication protocol in which the identifier of the access terminal is used to determine authentication challenges sent to the access terminal. The authenticator is configured to extract the second authentication challenge from the second packet and insert the second authentication challenge into the first packet.

In some examples, the first authentication protocol includes CHAP and the second authentication protocol includes IKEv2 EAP-MD5. The first challenge includes a dummy challenge, and the authenticator does not use the response to the first challenge for authenticating the access terminal. In some examples, the access terminal complies with CHAP. The access terminal complies with at least one of PPP CHAP and Mobile IP CHAP. The access terminal includes a mobile phone. The authenticator is configured to send the response to the second authentication challenge to an authentication server, and receive a message from the authentication server indicating that the access terminal has been authenticated.

In another aspect, in general, an apparatus includes an authenticator to enable authentication of an access terminal by an authentication server in which the authentication server uses a first authentication protocol that uses an identifier of the access terminal to determine an authentication challenge for the access terminal, and the access terminal uses a second authentication protocol that does not use an identifier of the access terminal to determine the authentication challenge. The authenticator is configured to send a first challenge to the access terminal in a packet complying with the second authentication protocol to obtain the identifier of the access terminal as part of a return message from the access terminal. The authenticator then sends a second challenge (an authentication challenge) to the access device to authenticate the access device, the authentication challenge being determined by the authentication server based on the identifier of the access device.

Implementations of the method may include one or more of the following features. The first authentication protocol includes CHAP and the second authentication protocol includes EAP-MD5. The first challenge includes a dummy challenge, and the authenticator does not use the response to the first challenge for authenticating the access terminal.

In another aspect, in general, a machine-accessible medium having instructions stored thereon, the instructions when executed cause a machine to perform operations including sending a dummy authentication challenge to an access terminal, receiving a first return message from the access terminal that includes an identifier of the access terminal and a response to the dummy challenge, sending a second authentication challenge to the access terminal, the second authentication challenge being determined based in part on the identifier of the access terminal previously received along with the response to the dummy challenge, and receiving a second return message from the access terminal that includes a response to the second authentication challenge.

Implementations of the method may include one or more of the following features. The instructions when executed further cause the machine to perform operations including sending the identifier of the access terminal to an authentication server, and receiving from the authentication server the second authentication challenge. The instructions when executed further cause the machine to perform operations including converting packets received from the access terminal from CHAP packet format to EAP packet format.

Advantages of the apparatus and methods can include one or more of the following. By integrating PPP CHAP (or Mobile IP CHAP) and IKEv2 EAP-MD5, a security gateway complying with IKEv2 EAP-MD5 can authenticate mobile users with legacy mobile devices using the same credential and authentication algorithm complying with CHAP that the legacy mobile devices were originally designed to use. In addition, the security gateway will be able to retrieve individual mobile user's policy configuration for policy enforcement using the mobile device's NAI.

DESCRIPTION

Figure 1:
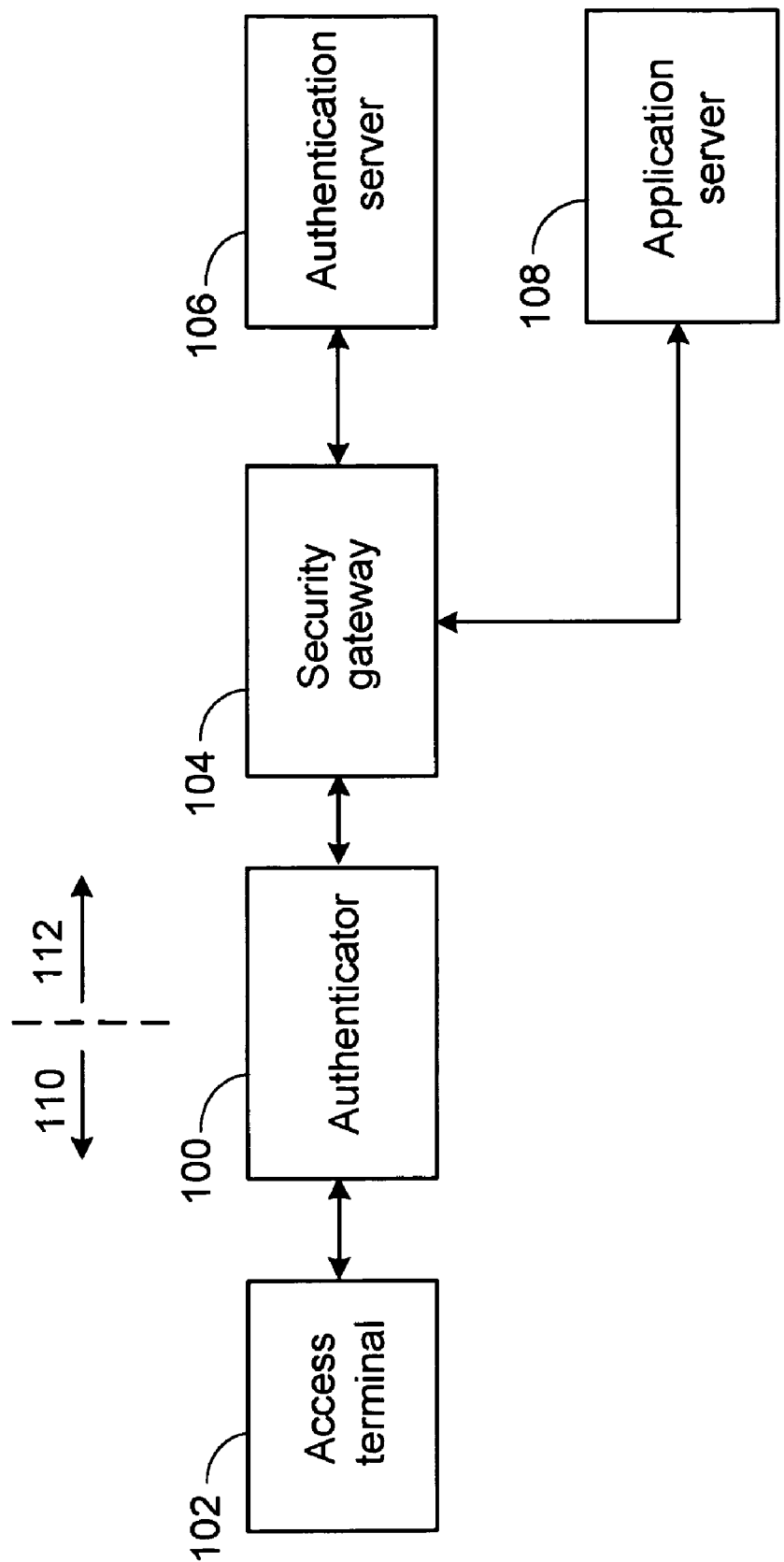
FIG. 1 is a block diagram of a system that authenticates devices prior to granting access to services.

Referring to FIG. 1, an authenticator 100 provides a bridge between devices using two different authentication protocols. On a client side 110, the authenticator 100 communicates with an access terminal 102 (e.g., a mobile phone or computer) that complies with, e.g., Point-to-Point Protocol Challenge Handshake Authentication Protocol (PPP CHAP) or Mobile Internet Protocol (Mobile IP) CHAP. On a server side 112, the authenticator 100 communicates with a security gateway 104 associated with an authentication sever 106 that stores account information and security information (e.g., passwords) useful for authenticating the access terminal 102. The security gateway 104 and the authentication server 106 use, e.g., Internet Key Exchange v2 Extensible Authentication Protocol-Message Digest 5 (IKEv2 EAP-MD5) for authentication. The security gateway 104 is also connected to an application server 108 that provides services to the access terminal 102 when authentication is successful.

The authenticator 100 can be viewed as a proxy authenticator. The authenticator 100 itself does not authenticate the access terminal 102. Rather, the authenticator 100 passes information from the access terminal 102 to the security gateway 104 and the authentication server 106 to allow the security gateway 104 and the authentication server 106 to authenticate the access terminal 102.

The description below uses examples in which the access terminal 102 complies with CHAP, whereas the security gateway 104 and the authentication server 106 comply with IKEv2 EAP-MD5. The authenticator 100 can also be used with devices that comply with other authentication protocols.

CHAP and EAP-MD5 have a similarity in that both protocols use the MD5 algorithm to determine passwords. However, there are a number of differences between the CHAP and EAP-MD5 authentication protocols that prevent direct integration of CHAP devices into networks that use EAP-MD5.

For example, in CHAP, an authenticator challenges an access terminal directly with a random number, so the authenticator does not require an identifier (e.g., network address identifier, NAI) of the access terminal prior to generating the challenge. By comparison, in EAP-MD5, an authentication server challenges the access terminal directly, using the NAI of the access terminal in determining the authentication challenge. NAI is a pre-assigned identifier that can be used by the authentication server 106 to recognize the access terminal 102. EAP-MD5 specifies that the NAI of the access terminal should be obtained before a challenge is generated. In EAP-MD5, an authenticator can operate in EAP "pass-through" mode, in which the authenticator performs checks on the code, identifier, and length fields of EAP packets transmitted between the access terminal and the authentication server, but does not generate the authentication challenge by itself.

The authenticator 100 provides protocol conversion by performing two functions. The first function is to obtain the NAI of the access terminal 102 before a challenge is generated by the authentication sever 106. In some examples, the authenticator 100 obtains the NAI from the access terminal 102 by using a "dummy" challenge. This challenge is not a real challenge because the response to the challenge is not used to authenticate the access terminal 102. The NAI of the access terminal 102 is sent to the security gateway 104 and forwarded to the authentication server 106. The authentication server 106 generates an authentication challenge based on the identifier and other security information. The authentication challenge is sent to the access terminal 102, and the access terminal's response to the authentication challenge is used to authenticate the access terminal 102.

Figure 4:
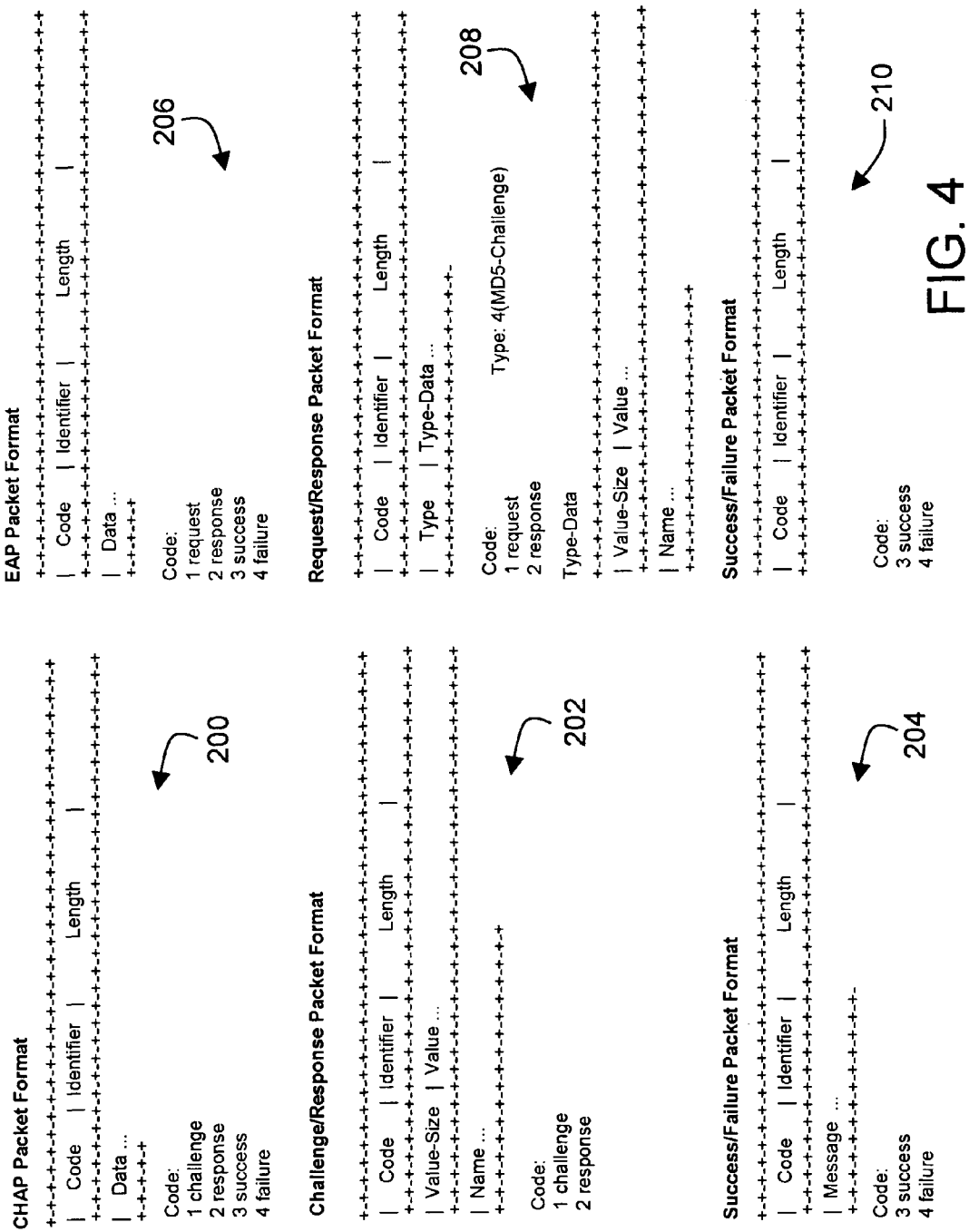
FIG. 4 shows data packet formats.

The second function of the authenticator 100 is to provide data packet format conversion between the two different authentication protocols. The CHAP and EAP packet formats are shown in FIG. 4. The authenticator 100 is configured to communicate with the access terminal 102 using packets that comply with CHAP packet format, and communicate with the security gateway 104 using packets that comply with EAP packet format.

The access terminal 102 can operate under two modes—Point-to-Point (PPP) mode or Mobile Internet Protocol (Mobile IP) mode, and comply with PPP CHAP or Mobile IP CHAP protocols. The authenticator 100 can communicate with the access terminal 102 that operates under either the PPP mode or the Mobile IP mode.

The authenticator 100 is useful in allowing legacy devices to access the services of newer networks that comply with newer authentication protocols. For example, there are many existing access terminals (e.g., mobile phones) that comply with CHAP. The IKEv2 protocol is developed many years after the development of CHAP. When service providers upgrade their networks to comply with the newer IKEv2 protocol, which uses the EAP-MD5 authentication method, legacy devices complying with CHAP may not be able to directly access the newer networks. The authenticator 100 provides a bridge between the two different protocols and allows the CHAP compliant access terminals to access the services provided by the EAP-MD5 compliant networks.

The authenticator 100 can communicate with the access terminal 102 through a wired connection or a wireless connection. Similarly, the authenticator 100 can communicate with the security gateway 104 through a wired connection or a wireless connection. The authenticator 100 can be located near the access terminal 102. For example, the access terminal 102 and the authenticator 100 can both be located in a user's home or office. In some examples, the authenticator 100 can be located near the security gateway 104, such as an add-on module to the security gateway 104.

Below of a description of an example of authenticating the access terminal 102 operating in the PPP mode, and followed by an example of authenticating the access terminal 102 operating in the Mobile IP mode.

Figure 2:
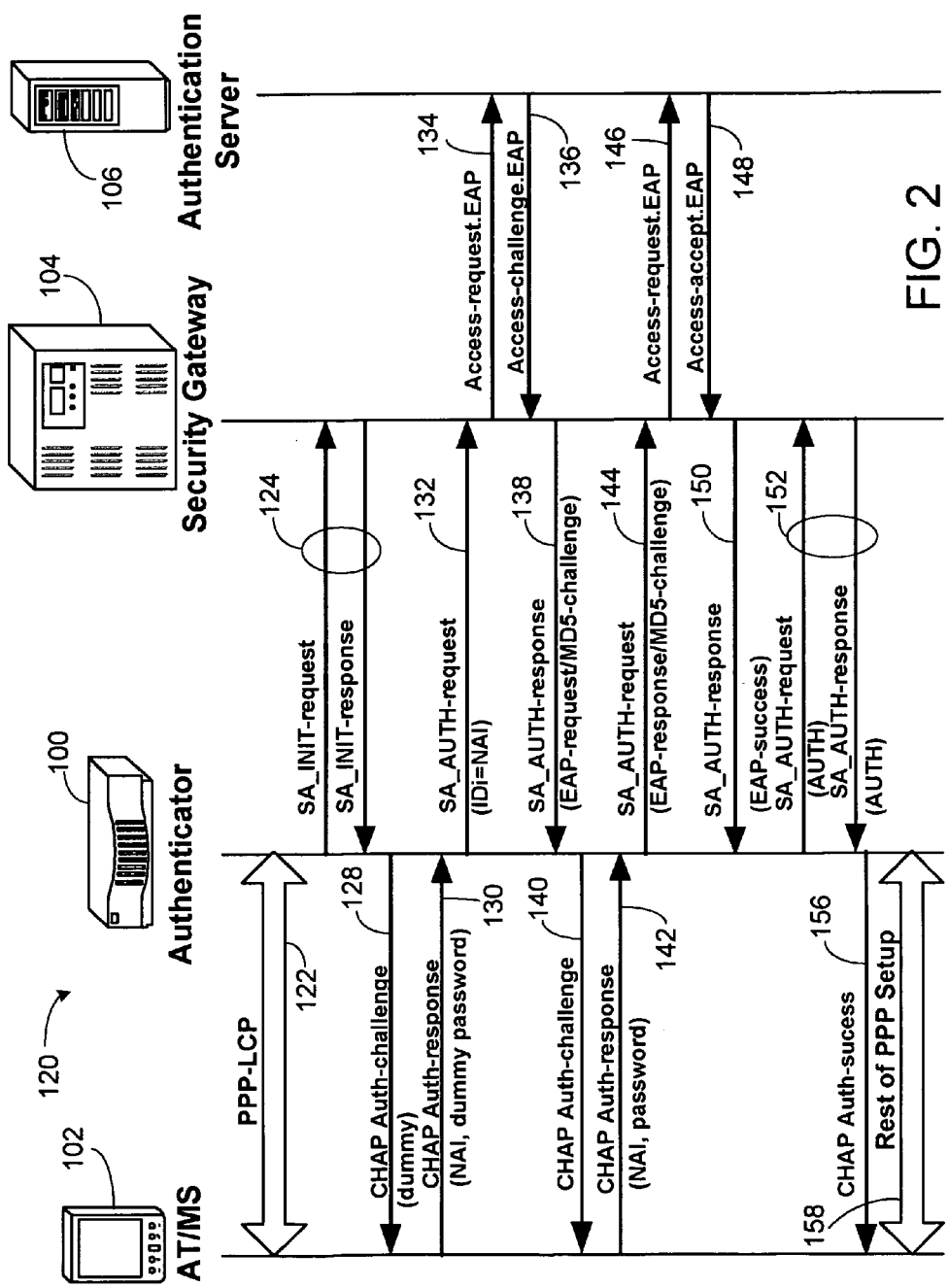
FIGS. 2 and 3 are message flow diagrams.

FIG. 2 is a diagram 120 of an example of a message flow for authenticating a CHAP compliant access terminal 102 operating in the PPP mode. The access terminal 102 initiates contact with the authenticator 100 and performs link establishment 122, in which configuration parameters are negotiated between the access terminal 102 and the authenticator 100 according to PPP-Link Control Protocol (LCP). The authenticator 100 establishes 124 a secure session with the security gateway 104 through an exchange of security association initiation request and response messages (SA_INIT. request and SA_INIT.reponse).

The authenticator 100 sends 128 a CHAP packet that includes a dummy authentication challenge to the access terminal 102. The access terminal 102 responds 130 by sending a CHAP packet that includes the NAI of the access terminal 102 and a response to the challenge. The purpose of sending the dummy challenge is to obtain the NAI, so the response to the dummy challenge is not used by the authenticator 100.

In this description, the term "CHAP packet" refers to a packet that is compatible with CHAP, and the term "EAP packet" refers to a packet that is compatible with EAP. The CHAP and EAP packet formats are shown in FIG. 4.

The authenticator 100 extracts the NAI in the CHAP packet, and sends 132 the NAI to the security gateway 104 in a security association authorization request message to allow the security gateway 104 to initiate 134 an access request to the authentication server 106. The access request includes the NAI of the access terminal 102. After receiving the access request, the authentication server 106 uses the NAI to determine an EAP authentication challenge using the MD5 algorithm, and returns 136 the challenge to the security gateway 104. The security gateway 104 forwards 138 the challenge in a security authorization response message to the authenticator 100, the message including an EAP packet.

The authenticator 100 extracts information from the EAP-MD5 authentication challenge and sends 140 the access terminal 102 a CHAP authentication challenge (which is a CHAP packet that includes the EAP-MD5 authentication challenge determined by the authentication server 106). The access terminal 102 responds to the CHAP authentication challenge as if the authenticator 100 challenges the access terminal 102 again. The authenticator 100 then formats the CHAP authentication response from the access terminal 102 into an EAP-response/MD5-challenge format and sends 144 the response to the security gateway 104. The security gateway 104 forwards 146 the response from the access terminal 102 to the authentication server 106, requesting authentication.

If the authentication server 106 authenticates the identity of the access terminal 102, the authentication sever 106 sends 148 a message indicating that authentication is successful. The security gateway 104 sends 150 an EAP-success message to the authenticator 100, indicating success of authentication. The authenticator 100 then authenticates 152 the secure communication between the authenticator 100 and the security gateway 104 using an exchange of security association authentication request and response messages (SA_AUTH-request and SA_AUTH-response), completing establishment of an IP security (IPSec) tunnel.

The authenticator 100 converts the EAP success message to a CHAP authentication success message and sends 156 the message to the access terminal 102. Additional information is exchanged 158 between the access terminal 102 and the authenticator 100 to complete the PPP communication link.

In FIG. 2, the messages that are transmitted between the access terminal 102 and the authenticator 100 comply with PPP CHAP. The messages that are transmitted between the authenticator 100 and the security gateway 104 comply with EAP. The authenticator 100 provides protocol conversion by converting the packets from CHAP packet format to EAP packet format, and vice versa.

Figure 3:
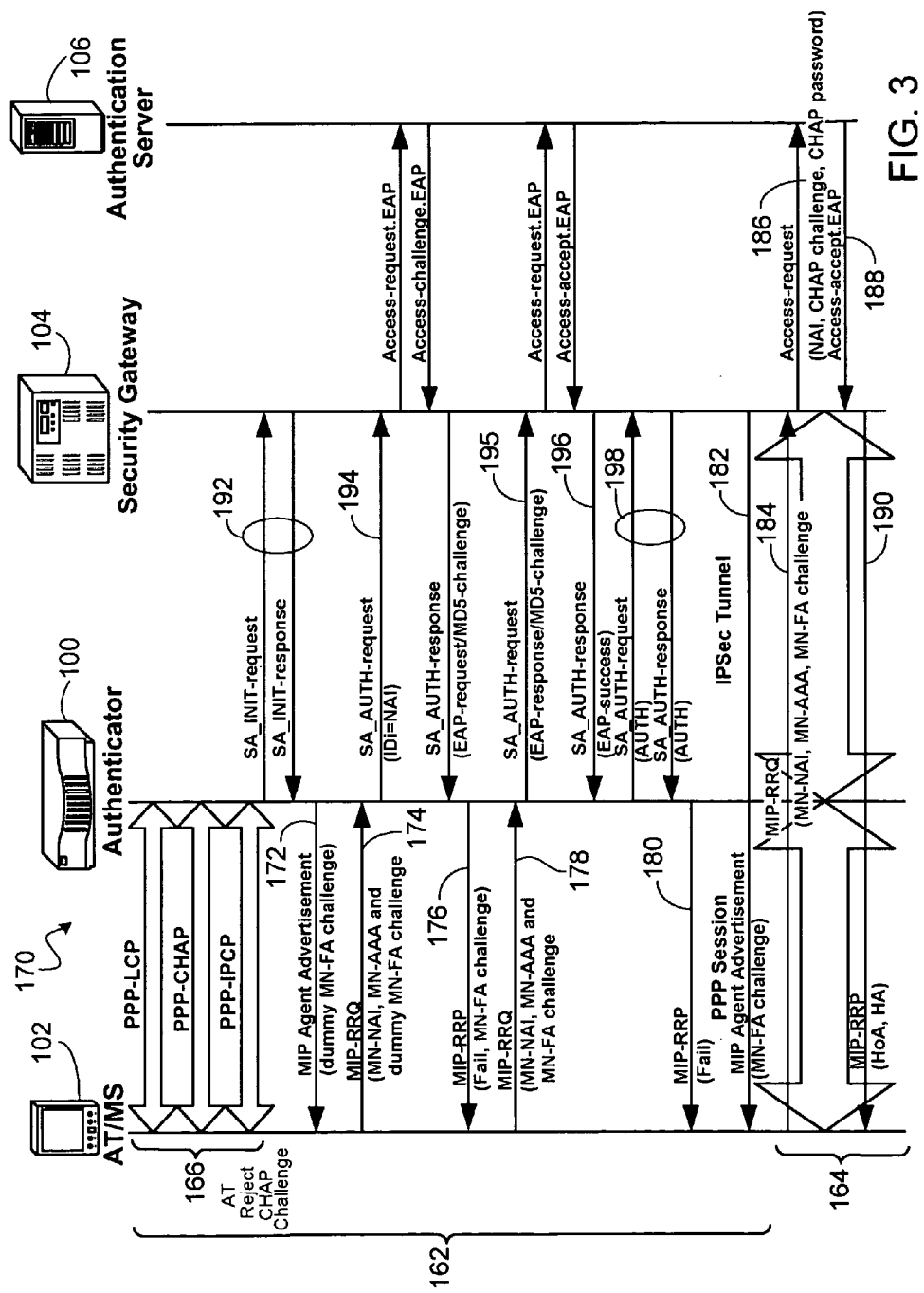

FIG. 3 is a diagram 170 of an example of a message flow for authenticating an access terminal 102 that complies with Mobile IP CHAP. When operating under the Mobile IP mode, the access terminal 102 is referred to as a mobile station 102. The security gateway 104 operates as a foreign agent.

In Mobile IP CHAP, the mobile station 102 expects a foreign agent advertisement to issue a challenge. Under the Mobile IP mode, the security gateway 104 needs a secure tunnel to be established before it can perform Mobile IP related transactions, such as issuing a challenge. To satisfy the above, authentication of the mobile station 102 is performed in two parts. In a first part 162, an IKEv2/IPSec tunnel is established and authenticated. In a second part 164, messages are exchanged in the IPSec tunnel to authenticate the mobile station 102.

The authenticator 100 may initially attempt to establish 166 a PPP communication link with the mobile station 102, but the attempts will be rejected by the mobile station 102. Then the authenticator 100 attempts to authenticate using Mobile IP.

In the first part 162, the authenticator 100 establishes 192 a secure session with the security gateway 104 through an exchange of security association initiation request and response messages. Next, the authenticator 100 sends to the mobile station 102 two challenges: a dummy challenge for the purpose of obtaining the NAI of the mobile station 102, and a real challenge used to authenticate the mobile station 102.

The authenticator 100 sends 172 a dummy CHAP authentication challenge in Mobile IP agent advertisement to the mobile station 102 for the purpose of obtaining the NAI of the mobile station 102. The mobile station 102 sends back 174 the MN-NAI (mobile node NAI), MN-AAA and MN-FA (foreign agent) challenge in a Mobile IP agent registration request (MIP-RRQ). The authenticator 100 sends 194 the NAI of the mobile station 102 to the security gateway 104 to allow the security gateway 104 to initiate an access request to the authentication server 106.

After the authentication server 106 receives the access request, the authentication server 106 determines an EAP-MD5 challenge using the NAI, and sends the EAP-MD5 challenge to the security gateway 104, which forwards the challenge to the authenticator 100. The authenticator 100 extracts relevant information from the EAP-MD5 challenge packet and sends 176 a CHAP authentication challenge to the mobile station 102 in a Mobile IP registration reply (RRP). The authenticator 100 includes a failure code in the RRP, indicating that the previous authentication attempt has failed. The mobile station 102 responds to the new CHAP authentication challenge with another Mobile IP registration request (RRQ) as if the authenticator 100 challenges the mobile station 102 again.

The authenticator 100 formats the CHAP authentication response into EAP-response/MD5-challenge format, and sends 195 the response to the security gateway 104. After successful authentication by the authentication server 106, the security gateway 104 sends 196 the EAP-success received from the authentication server 106 to the authenticator 100. The authenticator 100 then authenticates 198 the secure tunnel between the authenticator 100 and the security gateway 104.

Because the mobile station 102 sends a Mobile IP registration request through IPSec tunnel to the security gateway 104 (acting as foreign agent), the authenticator 100 does not convert the EAP-success to CHAP authentication success. Rather, the authenticator 100 sends 180 a failure code to the mobile station 102 in a Mobile IP registration reply (RRP) before the establishment of the IPSec tunnel. The failure code causes the mobile station 102 to expect to receive another authentication challenge.

In the second part 164, the security gateway 104, acting as foreign agent, sends 182 a Mobile IP agent advertisement with MN-FA challenge to the mobile station 102 after the IPSec tunnel is established. The mobile station 102 responds 184 with MN-NAI, MN-AAA and MN-FA challenge to the security gateway 104. The foreign agent (security gateway 104) then sends 186 NAI, CHAP challenge and the CHAP password to authentication server 106. After a successful authentication 188, the foreign agent (security gateway 106) sends back 190 the Mobile IP registration reply (RRP), indicating success of authentication.

In FIG. 3, the messages that are transmitted between the mobile station 102 and the authenticator 100 comply with Mobile IP CHAP. The messages that are transmitted between the authenticator 100 and the security gateway 104 comply with EAP. The authenticator 100 provides protocol conversion by converting the packets from CHAP packet format to EAP packet format, and vice versa.

FIG. 4 shows a comparison of the general CHAP packet format 200 and the general EAP packet format 206. Also shown are the CHAP challenge/response packet format 202, the CHAP success/failure packet format 204, the EAP request/response packet format 208, and the EAP success/failure packet format 210.

Figure 5:
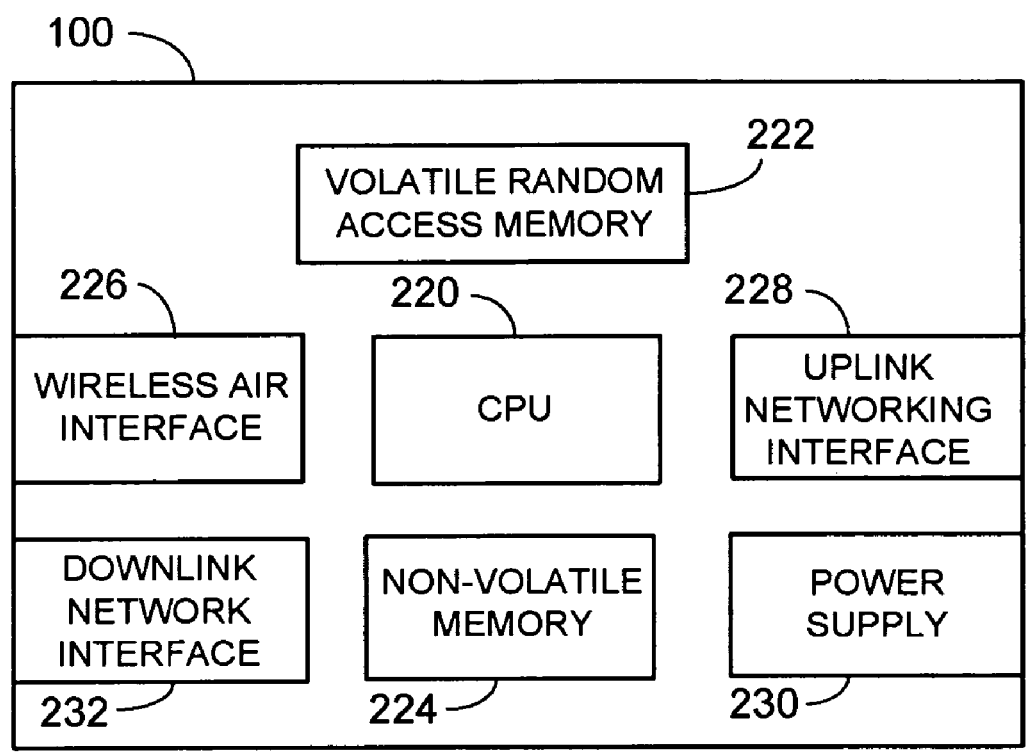
FIG. 5 is a schematic diagram of an authenticator.

FIG. 5 is a schematic diagram of an example of the authenticator 100. The authenticator 100 can be implemented by hardware or a combination of hardware and software. The components shown here, their connections and relationships, and their functions, are meant to be exemplary only, and are not meant to limit implementations of the inventions described and/or claimed in this document.

The authenticator 100 includes a central processing unit 220, a volatile random access memory 222, a non-volatile memory 224, a wireless air interface 226, an uplink networking interface 228, a downlink network interface 232, and a power supply 230. The non-volatile memory 224 stores software and configuration data, and can be, e.g., a hard disk drive, flash memory, or other types of non-volatile storage. The non-volatile memory 224 can be configured to read data and instructions from a removable storage medium, such as a magnetic or optical disc.

The authenticator 100 can send or receive information to or from the security gateway 104 through the uplink network interface 228, which can be, e.g., Ethernet, coaxial, or twisted pair telephone wire. The authenticator 100 can use the wireless air interface 226 (also called "air link") to send or receive information to or from a wireless access terminal 102 that is participating in the authentication process. The wireless air interface 226 includes, e.g., a radio frequency antenna, a radio module to send or receive radio signals, and a digital signal processor to process the radio signal. The radio module and the digital signal processor can be one integrated component or be built with discrete components. The authenticator 100 can use the downlink network interface 232 to communicate with a wired access terminal 102 that is participating in the authentication process. The downlink network interface 232 can be, e.g., Ethernet, coaxial, or twisted pair telephone wire.

Each of the components 220, 222, 224, 226, and 228 are interconnected using various buses, and may be mounted on a common motherboard or in other manners as appropriate. The processor 220 can process instructions for execution, including instructions stored in the volatile random access memory 222 or the non-volatile memory 224.

A computer program product can be tangibly embodied in an information carrier. The computer program product may also contain instructions that, when executed, perform one or more methods, such as those described above. The information carrier is a computer- or machine-readable medium, such as the volatile random access memory 222, the non-volatile memory 224, memory on the central processing unit 220, or a propagated signal. The instructions stored on the non-volatile memory 224 may be updated by the user.

Various implementations of the authenticator 100 and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, and may have input and/or output devices.

The computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A number of embodiments of the invention have been described. Nevertheless, it will be understood that various modifications may be made without departing from the spirit and scope of the invention. For example, various forms of the message flows shown above may be used, with the messages re-ordered, added, or removed. Also, although several applications and methods have been described, it should be recognized that numerous other applications are contemplated. Accordingly, other embodiments are within the scope of the following claims.

What is claimed is:

1. A method comprising:
sending a dummy authentication challenge from an authenticator to an access terminal;
receiving, at the authenticator, a first return message from the access terminal that includes an identifier of the access terminal and a response to the dummy challenge;
receiving, at the authenticator, a second packet from an authentication server, the second packet including a second authentication challenge, the second packet complying with a second authentication protocol in which the identifier of the access terminal is required for determining authentication challenges sent to the access terminal;
sending a first packet including the second authentication challenge from the authenticator to the access terminal, the second authentication challenge being determined based in part on the identifier of the access terminal previously received along with the response to the dummy challenge, the first packet complying with a first authentication protocol in which the identifier of the access terminal is not required for determining authentication challenges sent to the access terminal; and
receiving, at the authenticator, a second return message from the access terminal that includes a response to the second authentication challenge;
wherein the first authentication protocol comprises Challenge Handshake Authentication Protocol (CHAP) and the second authentication protocol comprises IKEv2 Extensible Authentication Protocol-Message Digest 5 (EAP-MD5).

2. The method of claim 1 wherein the second authentication challenge is determined by an authentication server based in part on the identifier of the access terminal.

3. The method of claim 1, further comprising extracting the second authentication challenge from the second packet and inserting the second authentication challenge into the first packet.

4. The method of claim 1 wherein the response to the dummy challenge is not used by the authenticator in authenticating the access terminal.

5. The method of claim 1 wherein the access terminal complies with Challenge Handshake Authentication Protocol (CHAP).

6. The method of claim 5 wherein the access terminal complies with at least one of Point-to-Point Protocol (PPP) CHAP and Mobile Internet Protocol (Mobile IP) CHAP.

7. The method of claim 1, further comprising sending the response to the second authentication challenge to an authentication server, and receiving a message from the authentication server indicating that the access terminal has been authenticated.

8. The method of claim 1 in which the dummy authentication challenge has a format that is the same as the format of the second authentication challenge.

9. The method of claim 1 in which the first return message has a format that is the same as the format of the second return message.

10. A method comprising:
   authenticating an access terminal comprising
      sending a dummy authentication challenge in a first Challenge Handshake Authentication Protocol (CHAP) packet to the access terminal,
      receiving a first return message from the access terminal that includes an identifier of the access terminal and a response to the dummy authentication challenge,
      sending the identifier to an authentication server in a first Extensible Authentication Protocol (EAP) packet and receiving an authentication challenge from the authentication server in a second EAP packet,
      extracting the authentication challenge from the second EAP packet and inserting the authentication challenge into a second CHAP packet, and
      sending the authentication challenge in the second CHAP packet, the authentication challenge being determined by the authentication server based on the identifier of the access terminal.

11. The method of claim 10 wherein the first challenge comprises a dummy challenge, and the response to the first challenge is not used by the authenticator in authenticating the access terminal.

12. A method comprising:
   sending a first Challenge Handshake Authentication Protocol (CHAP) packet to an access terminal to obtain a network address identifier (NAI) of the access terminal, the first CHAP packet including a dummy authentication challenge,
   sending a first Extensible Authentication Protocol (EAP) packet that includes the NAI to an authentication server,
   receiving a second EAP packet that includes a second authentication challenge that is determined based on the NAI,
   extracting the second authentication challenge from the second EAP packet and inserting the second authentication challenge into a second CHAP packet,
   sending the second CHAP packet including the second authentication challenge to the access terminal, and
   receiving from the access terminal third CHAP packet including a response to the second authentication challenge.

13. The method of claim 12 wherein the authentication server determines the authentication challenge using Message Digest 5 (MD5) algorithm.

14. The method of claim 12, further comprising sending a third EAP packet that includes the response to the authentication challenge to the authentication server, receiving a fourth EAP packet from the authentication server indicating that the access terminal has been authenticated, and sending a fourth CHAP packet to the access terminal indicating that the authentication has been successful.

15. The method of claim 12 wherein the first challenge comprises a dummy challenge, and the response to the first challenge is not used by the authenticator in authenticating the access terminal.

16. A method comprising:
   establishing a secure connection between an access terminal that complies with a first authentication protocol and an authentication server that complies with a second authentication protocol by
      sending a dummy authentication challenge to the access terminal,
      receiving a return message from the access terminal that includes an identifier of the access terminal and a response to the dummy authentication challenge,
      sending the identifier to the authentication server,
      receiving an authentication challenge from the authentication server, the authentication challenge determined based on the identifier,
      extracting the authentication challenge from a first packet sent from the authentication server and inserting the authentication challenge into a second packet sent to the access terminal, the first packet and the second packet having different packet formats,
      sending the authentication challenge to the access terminal,
      receiving a response to the authentication challenge from the access terminal, and
      sending the response to the authentication challenge to the authentication server;
   wherein the first authentication protocol does not require an identifier of the access terminal when determining authentication challenges sent to the access terminal, the second authentication protocol requires that the identifier of the access terminal be used when determining authentication challenges sent to the access terminal, the first authentication protocol comprises Challenge Handshake Authentication Protocol (CHAP), and the second authentication protocol comprises Extensible Authentication Protocol-Message Digest 5 (EAP-MD5).

17. The method of claim 16 wherein the first challenge comprises a dummy challenge, and the response to the first challenge is not used by the authenticator in authenticating the access terminal.

18. An apparatus comprising:
   an authenticating device configured to
      send a first authentication challenge to an access terminal,
      receive an identifier of the access terminal and a response to the first challenge from the access terminal,
      send a second authentication challenge to the access terminal, the second authentication challenge being determined by an authentication server based in part on the identifier of the access terminal previously received along with the response to the first challenge, and
      receive a response to the second authentication challenge;
   wherein the authenticator sends the second authentication challenge in a first packet that complies with a first authentication protocol in which the identifier of the access terminal is not required for determining authentication challenges sent to the access terminal, the authenticator is configured to extract the second authentication challenge from a second packet and insert the second authentication challenge into the first packet, the first authentication protocol comprises Challenge Handshake Authentication Protocol (CHAP), and the second packet complies with a second authentication protocol that comprises IKEv2 Extensible Authentication Protocol-Message Digest 5 (EAP-MD5).

19. The apparatus of claim 18 wherein the authenticator is configured to receive a second packet that includes the second authentication challenge from an authentication server, the second packet complying with a second authentication protocol in which the identifier of the access terminal is required for determining authentication challenges sent to the access terminal.

20. The apparatus of claim 18 wherein the first challenge comprises a dummy challenge, and the authenticator does not use the response to the first challenge for authenticating the access terminal.

21. The apparatus of claim 18 wherein the access terminal complies with Challenge Handshake Authentication Protocol (CHAP).

22. The apparatus of claim 18 wherein the access terminal complies with at least one of Point-to-Point Protocol (PPP) CHAP and Mobile Internet Protocol (Mobile IP) CHAP.

23. The apparatus of claim 18 wherein the access terminal comprises a mobile phone.

24. The apparatus of claim 18 wherein the authenticator is configured to send the response to the second authentication challenge to an authentication server, and receive a message from the authentication server indicating that the access terminal has been authenticated.

25. An apparatus comprising:
an authentication device enabling authentication of an access terminal by an authentication server in which the authentication server uses a first authentication protocol that requires an identifier of the access terminal in order to determine an authentication challenge for the access terminal, and the access terminal uses a second authentication protocol that does not require an identifier of the access terminal in order to determine the authentication challenge,
wherein the authenticator is configured to send a first challenge to the access terminal in a first packet complying with the second authentication protocol to obtain the identifier of the access terminal as part of a return message from the access terminal, extract an authentication challenge from a second packet that complies with the first authentication protocol and insert the authentication challenge into a third packet that complies with the second authentication protocol, the authenticator sending the authentication challenge to the access device to authenticate the access device, the authentication challenge being determined by the authentication server based on the identifier of the access device, the first authentication protocol comprising Extensible Authentication Protocol-Message Digest 5 (EAP-MD5), and the second authentication protocol comprising Challenge Handshake Authentication Protocol (CHAP).

26. The apparatus of claim 25 wherein the first challenge comprises a dummy challenge, and the authenticator does not use the response to the first challenge for authenticating the access terminal.

27. A non-transitory machine-accessible medium having instructions stored thereon, the instructions when executed cause one or more machines to perform operations comprising:
sending a dummy authentication challenge to an access terminal;
receiving a first return message from the access terminal that includes an identifier of the access terminal and a response to the dummy challenge;
receiving, at the authenticator, a second packet from an authentication server, the second packet including a second authentication challenge, the second packet complying with a second authentication protocol in which the identifier of the access terminal is required for determining authentication challenges sent to the access terminal;
sending a first packet including the second authentication challenge to the access terminal, the second authentication challenge being determined based in part on the identifier of the access terminal previously received along with the response to the dummy challenge, the first packet complying with a first authentication protocol in which the identifier of the access terminal is not required for determining authentication challenges sent to the access terminal; and
receiving a second return message from the access terminal that includes a response to the second authentication challenge.

28. The machine-accessible medium of claim 27 wherein the instructions when executed further cause the machine to perform operations comprising sending the identifier of the access terminal to an authentication server, and receiving from the authentication server the second authentication challenge.

29. The machine-accessible medium of claim 27 wherein the instructions when executed further cause the machine to perform operations comprising converting packets received from the access terminal from CHAP packet format to EAP packet format.

* * * * *